(No Model.)  2 Sheets—Sheet 1.
W. W. AVERELL.
SEA BRIDLE.
No. 310,551.  Patented Jan. 13, 1885.
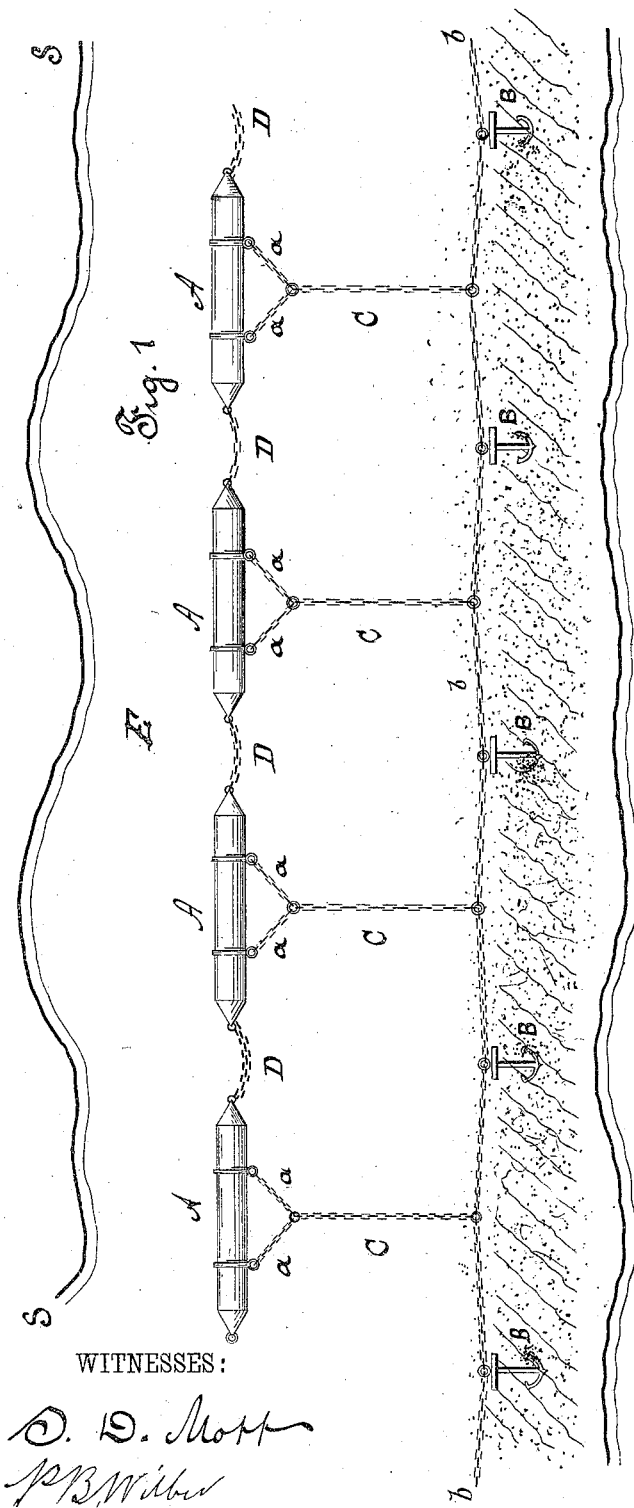
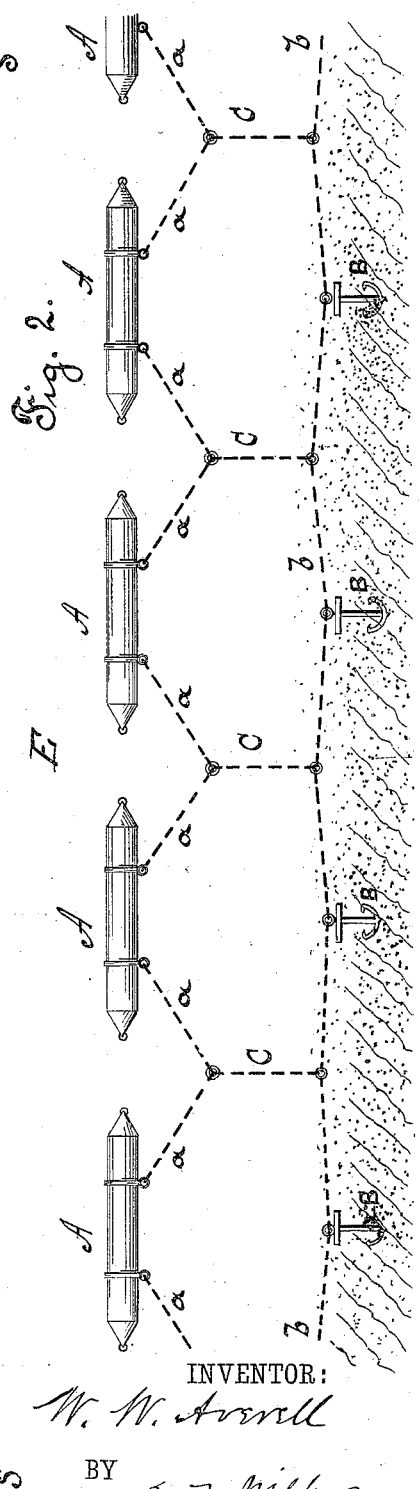
WITNESSES:
D. D. Mott
P. B. Wilber
INVENTOR:
W. W. Averell
BY Z. F. Wilber
ATTORNEY.

(No Model.) 2 Sheets—Sheet 2.
W. W. AVERELL.
SEA BRIDLE.
No. 310,551. Patented Jan. 13, 1885.
Fig. 3.
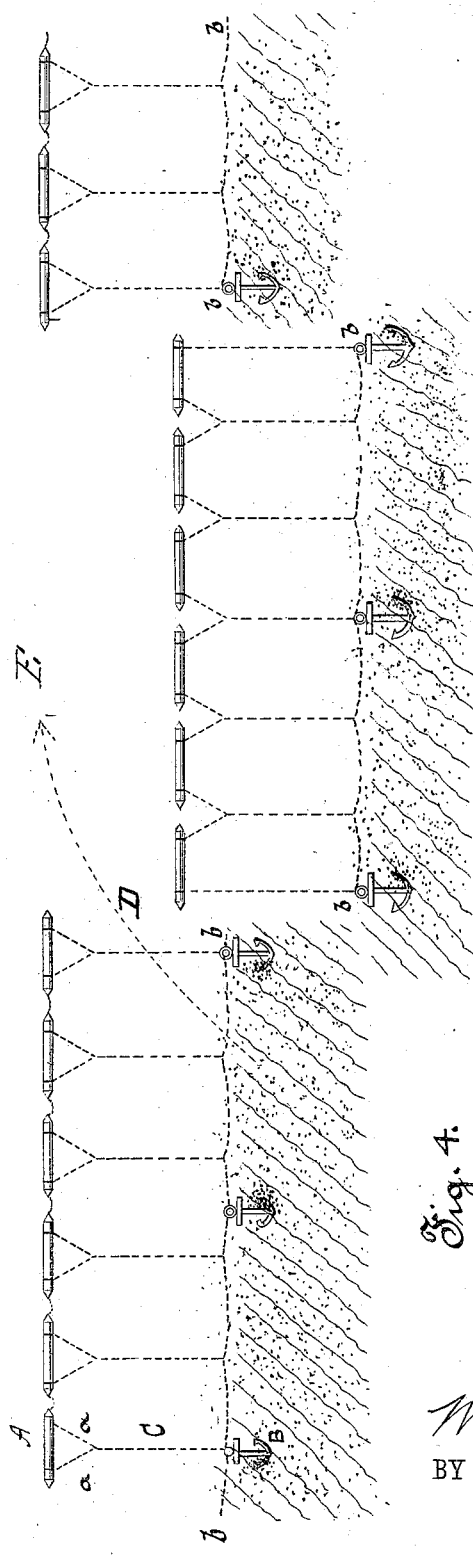
Fig. 4.
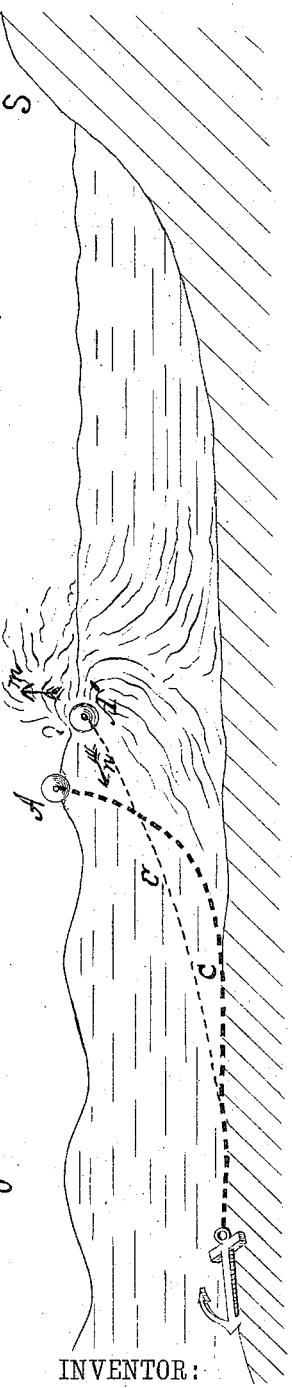
WITNESSES:
O. D. Morr
P. B. Wilber
INVENTOR:
W. W. Averell
BY Z. F. Wilber
ATTORNEY.

UNITED STATES PATENT OFFICE.

WILLIAM W. AVERELL, OF BATH, NEW YORK.

SEA-BRIDLE.

SPECIFICATION forming part of Letters Patent No. 310,551, dated January 13, 1885.

Application filed March 1, 1884. (No model.)

*To all whom it may concern:*

Be it known that I, WILLIAM W. AVERELL, a citizen of the United States, residing at Bath, in the county of Steuben and State of New York, have invented new and useful Improvements in Sea-Bridles, of which the following is a specification.

The object of my invention is to mask or cover a coast, in order to prevent the erosive action of waves upon it, to create artificial harbors, or to create bars in front of threatened coasts. It is a fact which has been established by long experience that rigid breakwaters, of whatever construction or material, are torn, fractured, overthrown, undermined, or destroyed in a short time by the persistent force of wave action, and, moreover, that their first cost is very great, and their cost for repairs so large and constant that they are not susceptible of the extension necessary to mask an extended or continuous coast-line. Such breakwaters as have thus far been devised have sometimes become additional elements of danger instead of protection to the coast and to vessels approaching them. The principle that the immobility of an object in the sea invites destruction has been partially ignored, and the order of equilibrium required to control or divert wave motion has not been recognized in any of the constructions hitherto made. This is especially so in the large and comparatively rigid structures which have been proposed as "floating breakwaters." In addition to their great first cost, which of itself has been sufficient to negative their use, their comparative rigidity and immobility furnished causes for their destruction when acted on by the persistent forces of the sea. The fact that the direction of wave motion once diverted cannot be resumed, and that the momentum of the water alone acting in different and intercepting directions becomes the active agent to produce the surf which ensues, seems to have been overlooked. Any body floating freely in water is prevented, by its inertia and by the water, from traveling as fast as wave motion, and if the waves have sufficient height or energy they break over it and a relative calm for a space beyond will be produced. If such bodies, therefore, be permitted to float with freedom within certain limits, and their return to the desired line of usefulness be insured by a force whose tension will increase in proportion to their distance from that line, we shall have a system approaching a stable equilibrium. The forces requisite to hold such constructions within limits of sufficient mobility to prevent their destruction by wave action, and at the same time to furnish a resistance which, together with the inertia of the construction, is adequate to change the direction of wave motion, may be found in a chain or cable so attached and supported as to assume the form of a catenary curve. As embodying these principles and accomplishing the objects of my invention, I propose to establish a breakwater or artificial coast-line, to be formed of cylinders or prisms of wood, iron, or any sufficiently buoyant material, connected together in line or in lines, or in lines in echelon, and anchored to the bottom at a suitable distance from the natural coast or shore, and also from each other, in order to interrupt and change the direction of the natural wave motion, so as to cause the surf to occur at or near such breakwater, and thereby to produce relative calm between it and the shore or beach. I propose to set or fix a line of anchors of sufficient weight and strength parallel to the coast or cape to be covered, through the rings of which shall run a heavy chain or wire cable, to which shall be made fast or linked by lighter chains or cables a line of cylinders composed as above mentioned and arranged parallel to the line of anchors, the cylinders to be from ten to fifty feet, or more, in length, and from six to twenty-four inches in diameter, their ends to be of a pyramidal, conical, or ellipsoidal form to prevent injury by collision with each other. The length of the chains or cables attaching the cylinders to the anchor chain or cable should be not less than three times the depth of the anchors at high water, and preferably not less than five of the same units. The ends of the cylinders are to be tied together with chains or cables of sufficient length to prevent any two cylinders coming into collision when all the others are in a normal position of quiet, and the branch connections of the anchoring chains or cables of the cylinders are to be fastened to them at two points, each one-fourth of their length from each end and joining to the anchoring-chains at one angle of a triangle, and the other two angles of such triangle may be fastened to the ends of two adjacent cylinders. These lines of cylinders may be broken into echelons at convenient intervals to admit the passage of vessels. The ends of such echelons may be marked by buoys or buoy shapes on the ends of cylinders, or by colors, bells, or lights, or otherwise. Electric lights or signals might be displayed along the entire system or at important points. There may be more than one line of cylinders connected with each other or to another line of anchors when the depth of water and distance from shore would render them advisable or desirable. The lifting and sinking of the catenary curves of the chains or cables engaged in the anchorage, together with the inertia of the construction, will afford all the resistance and elasticity required to interrupt the wave motion and to prevent destruction of the floating obstructions in any weather. An approaching wave would lift the buoy, prism, or cylinder and bear it in the direction of the wave motion; but its inertia, assisted by the increasing tension of the catenary, would in a moment become equal to the propelling force of the section of the wave in contact with it and arrest it, when the water above the section in contact would pass over the buoy and take a new direction downward with a return curve, the submerged buoy would follow the line of least resistance, the direction of which would be indicated by the diagonal of the parallelogram of the two forces, buoyancy and catenary tension, acting upon it and be brought to its original position, having described an ellipse whose axes would be determined by the wave height and length. A ship of which control had been lost would override the obstructions without injury to them, and, finding herself in a comparative calm, or even on shore, would be able to launch her boats and save passengers, crew, and cargo, as at a dock. At exceedingly rough points the anchors may be "backed" in order to prevent their disturbance. An inner or shore line of anchors may be found useful at some points. By the device above described the water itself which first passes over the obstructions breaks the direction and continuity of the wave motion and creates the surf, which furnishes the outward limit of the calm desired. The chains, anchors, and cylinders used may be so coated or chemically treated as to prevent oxidation. The anchors should be set, of course, for a landward strain, as that will always be the one which it will be necessary to meet. This device of floating cylinders thus arranged, which may be called a "sea-bridle," may be used to create bars in front of an eroded coast, where the materials of the bottom are of a suitable character to be rendered movable or shifting when the wave action is concentrated upon them along the line of the bridle. This system is susceptible of an extension limited only by the extent of the coast to be covered.

In order to more fully set forth the invention, reference is made to the drawings, in which—

Figures 1, 2, and 3 are plan views embodying the invention, and Fig. 4 is a cross-section thereof.

In all these figures, A is a cylinder or prism, of wood, iron, or other buoyant material or construction, which it is intended to normally maintain at any desired distance from the shore-line S. B B are anchors, through whose rings runs the main chain or cable $b$ $b$. To this main chain or cable stay chains or cables C, preferably one for each cylinder or prism, are attached, each stay chain or cable being connected to two branch chains or cables, $a$ $a$, fastened to bands on the cylinders or prisms.

In Fig. 1 the two branch chains or cables of each stay chain or cable C are fastened to one and the same cylinder or prism, while in Fig. 2 each stay chain or cable C is fastened to the branch chains or cables $a$ $a$ of two contiguous cylinders or prisms. The band to which the branch chains or cables are fastened should be, for the best effect, at about one-quarter the length of the cylinder from its ends. The ends of the cylinders should be made conical, ellipsoidal, or tapering, to avoid injury from collision with each other, and when of wood or other soft buoyant material should be shod or protected with iron. The cylinders should be connected into one organization by chains or cables D, as seen in Fig. 1, although when the plan shown in Fig. 2 is used these connecting chains or cables may be dispensed with, as in such case the branch chains or cables $a$ act also as connecting chains or cables. The straight line length of chain or cable from A to the main chain or cable $b$ should be at least three times the high-water depth at the anchorage-point, while five of such units are preferable, as affording the best catenary curve, as shown in the heavy dotted line C in Fig. 4.

The action is as follows: The wave motion, which, when interrupted by shoaling, forms the surf, strikes against the cylinder or prism A, which, restrained by the catenary curve C, (see Fig. 4,) presents a mobile resistance. The motion carries A forward, say, to the position A', when the resistance of the catenary becomes equal to the force of the wave motion. At such points the wave breaks over A, forming the surf at that point. As this wave motion once interrupted cannot be recreated in any comparatively short distance, there is relative calm between the line of cylinders or prisms and the shore. After the wave has broken over A, two forces are acting upon it—its buoyancy in the direction of the arrow $m$, and the force of the catenary in the direction of the arrow $n$, the latter being the stronger. Its motion then, according to the parallelogram of forces, will be in a curve back to A, its entire movement from and to A being an ellipse. A construction such as this insures an elastic mobile resistance to the persistent wave action, and the whole structure possesses in the highest degree a stable equilibrium of an oscillating order—that is, the quality of always returning to its original position after the cause of such movement has ceased to act or been overcome. The cylinders or prisms may be arranged in a line, as in Figs. 1 and 2, or in lines of echelon, as in Fig. 3.

In Figs. 1 and 2, vessels seeking or driven upon the shore can safely pass over the buoyant line, while in Fig. 3 they may enter the calm region between the lines, as indicated by D.

Having thus described my invention, what I claim is as follows:

1. The combination of a prism or cylinder of buoyant material or construction, an anchor therefor, and main and stay chains or cables, substantially as set forth.

2. The combination of a series of prisms or cylinders of buoyant material or construction, anchors therefor, main and stay chains or cables, and connecting chains or cables, substantially as set forth.

3. The combination of a series of prisms or cylinders of buoyant material or construction arranged in line or lines, the lines being arranged in echelon, anchors, main, stay, and branch chains or cables, substantially as set forth.

4. The combination of a prism or cylinder of buoyant material or construction, an anchor, and a chain or cable, with branch connections connecting the two, and of such length that it always assumes the form of a catenary curve, for meeting the varied forces producing wave motion and diverting the direction of the waves, substantially as set forth.

In testimony whereof I have hereunto set my hand in the presence of two subscribing witnesses.

WM. W. AVERELL.

Witnesses:
JAMES L. NORRIS,
J. A. RUTHERFORD.